United States Patent
Nakamura

(10) Patent No.: US 6,847,777 B1
(45) Date of Patent: Jan. 25, 2005

(54) VIDEO PLAYER AND VIDEO PLAYBACK METHOD OF A VIDEO PLAYER HAVING AN AUDIO-VISUAL RESTRICTION CAPABILITY

(75) Inventor: Teruyuki Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 967 days.

(21) Appl. No.: 09/592,993

(22) Filed: Jun. 13, 2000

(30) Foreign Application Priority Data

Jun. 14, 1999 (JP) .......................................... 11-166678

(51) Int. Cl.⁷ ................................................ H04N 5/91
(52) U.S. Cl. ............................. 386/46; 386/94; 386/95
(58) Field of Search ................................ 386/1, 83, 94, 386/46, 95; 360/60; 380/201, 202, 203; H04N 5/91

(56) References Cited

U.S. PATENT DOCUMENTS

| | | | | |
|---|---|---|---|---|
| 5,691,972 A | * | 11/1997 | Tsuga et al. ............. | 369/275.3 |
| 5,911,032 A | * | 6/1999 | Hirayama et al. ............ | 386/95 |
| 5,969,748 A | * | 10/1999 | Casement et al. ............ | 725/27 |
| 6,643,715 B1 | * | 11/2003 | Arthur ......................... | 710/14 |
| 6,662,365 B1 | * | 12/2003 | Sullivan et al. ............... | 725/25 |
| 6,704,787 B1 | * | 3/2004 | Umbreit ...................... | 709/229 |
| 2002/0049806 A1 | * | 4/2002 | Gatz et al. .................. | 709/203 |

FOREIGN PATENT DOCUMENTS

JP          10-242874          9/1998

* cited by examiner

Primary Examiner—Vincent Boccio
(74) Attorney, Agent, or Firm—Sughrue Mion, PLLC

(57) ABSTRACT

A video player including playback means for playing back a video recording medium, control means for controlling the playback means in response to external input, as well as externally outputting a video signal played back by the playback means, and operation means for inputting setting data input by a user to said control means, as well as externally displaying setting data output from the control means, said control means including a current time and date output unit for outputting current time and date, a date of birth storage unit for storing a date of birth of each viewer input through said operation means, a viewer's age calculation unit for calculating an age of each viewer based on a date of birth stored in said date of birth storage unit and current time and date output by said current time and date output unit, and a parental lock control unit for determining allowance/non-allowance of playback by said playback means based on parental lock information stored in advance in said video recording medium and an age calculated by said viewer's age calculation unit.

19 Claims, 5 Drawing Sheets

VIDEO PLAYER AND VIDEO PLAYBACK METHOD OF A VIDEO PLAYER HAVING AN AUDIO-VISUAL RESTRICTION CAPABILITY

BACKGROUND OF THE INVENTION

1. Field of the Invention

The present invention relates to a video player and, more particularly, to a video player for playing back video with audio-visual restrictions according to the audio-visual restrictions.

2. Description of the Related Art

Conventionally used as video recording media are a laser disc (LD), a digital versatile disc and a digital video disc (DVD: registered trademark). DVD has a parental lock function of placing audio-visual restrictions (hereinafter referred to as parental lock) on video which has a possibility of exerting adverse effects on growth and development of those under a certain age. With an age of a viewer registered in a DVD player, this function is inhibiting playback according to the contents of a parental lock. DVD also realizes multi-story which enables a plurality of stories to be determined, multi-angle which enables selection of a plurality of angles and dubbing in other language depending on a manner of storage of video data and voice data. DVD therefore enables small children to view the video in other story than original one while skipping violence scenes on which a parental lock is set.

Then, for such a parental lock, an age of a viewer is registered in a conventional DVD player.

As a conventional example of such a parental lock based on ages, there is a technique disclosed in Japanese Patent Laid-Open (Kokai) No. Heisei 10-242874. This technique relates to switching of an output channel to a promotion channel or other channel without leaving the output channel as it is when a function related to parental lock (audio-visual restrictions) is activated at a digital broadcasting receiver.

Conventional DVD players, however, have a problem that a parental lock effective to a specific user is not effective to other user because of lack of taking into consideration the use of the same DVD player application by a plurality of users. Another problem is that since a parental lock for a user is fixed, the parental lock should be changed every time the user completes his birthday.

SUMMARY OF THE INVENTION

An object of the present invention is to provide a video recorder and player which improves the inconvenience of conventional techniques and is allowed to exhibit the function related to a parental lock optimally when numbers of people use the same video recorder and player such as a DVD player at home, a meeting place and the like.

According to the first aspect of the invention, a video player comprising playback means for playing back a video recording medium, control means for controlling the playback means in response to external input, as well as externally outputting a video signal played back by the playback means, and operation means for inputting setting data input by a user to the control means, as well as externally displaying setting data output from the control means, wherein the control means comprises a current time and date output unit for outputting current time and date, a date of birth storage unit for storing a date of birth of each viewer input through the operation means, a viewer's age calculation unit for calculating an age of each viewer based on a date of birth stored in the date of birth storage unit and current time and date output by the current time and date output unit, and a parental lock control unit for determining allowance/non-allowance of playback by the playback means based on parental lock information stored in advance in the video recording medium and an age calculated by the viewer's age calculation unit.

Here, a date of birth of each viewer is stored in a date of birth storage unit and a current time and date output unit outputs current time and date when a playback means is used. Then, a viewer's age calculation unit calculates an age of a viewer by subtracting the date of birth stored in the date of birth storage unit from the current time and date. Subsequently, a parental lock control unit determines whether playback by the playback means is allowed or not based on parental lock information read by the playback means and the calculated viewer's age. The determination on allowance/non-allowance includes inhibition and allowance of playback itself and when a part of scenes has a parental lock, allowance of playback of a story on which no parental lock is set. Thus, a parental lock is automatically controlled according to current time and date.

In addition, the present invention facilitates parental lock processing executed when the same player is used by numbers of persons. In this example, a control means preferably includes a viewer registration control unit for storing the date of birth of each viewer in the date of birth storage unit, as well as outputting a password of each viewer to the operation means when a password for a manager is applied through an operation means. A viewer not knowing the password for a manager is not allowed to register his date of birth and accordingly not enabled to invalidate the parental lock function. Moreover, the parental lock control unit may have a playback allowance control function of controlling the viewer's age calculation unit, when a password of each viewer is applied through the operation means, to calculate an age of a viewer whose password is applied, as well as controlling the playback means to start playback when the viewer has no parental lock set thereon. With the playback allowance control function which requires input of a password every time video is to be viewed, the parental lock function is maintained by placing restrictions on viewers whose passwords are not issued.

In the preferred construction, the control means comprises a viewer registration control unit for storing the date of birth of each viewer in the date of birth storage unit when a password for a manager is input through the operation means, as well as outputting a password for each viewer to the operation means.

In another preferred construction, the control means comprises a viewer registration control unit for storing the date of birth of each viewer in the date of birth storage unit when a password for a manager is input through the operation means, as well as outputting a password for each viewer to the operation means, and the parental lock control unit having a playback allowance control function of controlling, when a password for each viewer is input through the operation means, the viewer's age calculation unit to calculate an age of a viewer whose password is input, as well as controlling the playback means to start playback when no parental lock is set on the viewer in question.

In another preferred construction, the control means comprises a viewer registration control unit for storing the date of birth of each viewer in the date of birth storage unit when a password for a manager is input through the operation means, as well as outputting a password for each viewer to the operation means, and the parental lock control unit having a playback inhibition control function of controlling, when a password for each viewer is input through the operation means, the viewer's age calculation unit to calculate an age of a viewer whose password is input, as well as inhibiting playback by the playback means when a parental lock is set on the viewer in question.

In another preferred construction, the control means comprises a viewer registration control unit for storing the date of birth of each viewer in the date of birth storage unit when a password for a manager is input through the operation means, as well as outputting a password for each viewer to the operation means, and the parental lock control unit having a viewing-allowed video playback control function of controlling, when a password for each viewer is input through the operation means, the viewer's age calculation unit to calculate an age of a viewer whose password is input, as well as controlling, when a parental lock is set on the viewer in question, the playback means to play back video on which the parental lock in question is not set.

In another preferred construction, the control means comprises a viewer registration control unit for storing the date of birth of each viewer in the date of birth storage unit when a password for a manager is input through the operation means, as well as outputting a password for each viewer to the operation means, and the parental lock control unit having a playback allowance control function of controlling, when a password for each viewer is input through the operation means, the viewer's age calculation unit to calculate an age of a viewer whose password is input, as well as controlling the playback means to start playback when no parental lock is set on the viewer in question, and a function of controlling, when a plurality of passwords each for each viewer are input through the operation means, the viewer's age calculation unit to calculate an age of a viewer whose password is input, as well as determining allowance/non-allowance of playback based on the youngest age among the ages of the respective viewers calculated by the viewer's age calculation unit.

In another preferred construction, the control means comprises a viewer registration control unit for storing the date of birth of each viewer in the date of birth storage unit when a password for a manager is input through the operation means, as well as outputting a password for each viewer to the operation means, and the parental lock control unit having a playback inhibition control function of controlling, when a password for each viewer is input through the operation means, the viewer's age calculation unit to calculate an age of a viewer whose password is input, as well as inhibiting playback by the playback means when a parental lock is set on the viewer in question, and a function of controlling, when a plurality of passwords each for each viewer are input through the operation means, the viewer's age calculation unit to calculate an age of a viewer whose password is input, as well as determining allowance/non-allowance of playback based on the youngest age among the ages of the respective viewers calculated by the viewer's age calculation unit.

In another preferred construction, the control means comprises a viewer registration control unit for storing the date of birth of each viewer in the date of birth storage unit when a password for a manager is input through the operation means, as well as outputting a password for each viewer to the operation means, and the parental lock control unit having a viewing-allowed video playback control function of controlling, when a password for each viewer is input through the operation means, the viewer's age calculation unit to calculate an age of a viewer whose password is input, as well as controlling, when a parental lock is set on the viewer in question, the playback means to play back video on which the parental lock in question is not set, and a function of controlling, when a plurality of passwords each for each viewer are input through the operation means, the viewer's age calculation unit to calculate an age of a viewer whose password is input, as well as determining allowance/non-allowance of playback based on the youngest age among the ages of the respective viewers calculated by the viewer's age calculation unit.

According to the second aspect of the invention, a video playback method of a video player having playback means for playing back a video recording medium, control means for controlling the playback means in response to external input, as well as externally outputting a video signal played back by the playback means, and operation means for inputting setting data input by a user to the control means, as well as externally displaying setting data output from the control means, comprising the steps of calculating an age of each viewer based on a date of birth stored in a date of birth storage unit and current time and date output by a current time and date output unit, and determining allowance/non-allowance of playback by the playback means based on parental lock information stored in advance in the video recording medium and an age calculated by a viewer's age calculation unit.

In the preferred construction, the video playback method of a video player further comprising the step of storing the date of birth of each viewer in the date of birth storage unit when a password for a manager is input through the operation means, as well as outputting a password for each viewer to the operation means.

In another preferred construction, the video playback method of a video player further comprising the steps of storing the date of birth of each viewer in the date of birth storage unit when a password for a manager is input through the operation means, as well as outputting a password for each viewer to the operation means, and when a password for each viewer is input through the operation means, calculating an age of a viewer whose password is input, as well as to starting playback by the playback means when no parental lock is set on the viewer in question.

In another preferred construction, the video playback method of a video player further comprising the steps of storing the date of birth of each viewer in the date of birth storage unit when a password for a manager is input through the operation means, as well as outputting a password for each viewer to the operation means, and when a password for each viewer is input through the operation means, calculating an age of a viewer whose password is input, as well as inhibiting playback by the playback means when a parental lock is set on the viewer in question.

In another preferred construction, the video playback method of a video player further comprising the steps of:

storing the date of birth of each viewer in the date of birth storage unit when a password for a manager is input through the operation means, as well as outputting a password for each viewer to the operation means, and when a password for each viewer is input through the operation means, calculating an age of a viewer whose password is input, as well as controlling, when a parental lock is set on the viewer in question, the playback means to play back video on which the parental lock in question is not set.

In another preferred construction, the video playback method of a video player further comprising the steps of:

storing the date of birth of each viewer in the date of birth storage unit when a password for a manager is input through the operation means, as well as outputting a password for each viewer to the operation means, when a password for each viewer is input through the operation means, calculating an age of a viewer whose password is input, as well as starting playback by the playback means when no parental lock is set on the viewer in question, and when a plurality of passwords each for each viewer are input through the operation means, calculating an age of a viewer whose password is input, as well as determining allowance/non-allowance of playback based on the youngest age among the calculated ages of the respective viewers.

In another preferred construction, the video playback method of a video player further comprising the steps of storing the date of birth of each viewer in the date of birth storage unit when a password for a manager is input through the operation means, as well as outputting a password for each viewer to the operation means, when a password for each viewer is input through the operation means, calculating an age of a viewer whose password is input, as well as inhibiting playback by the playback means when a parental lock is set on the viewer in question, and when a plurality of passwords each for each viewer are input through the operation means, calculating an age of a viewer whose password is input, as well as determining allowance/non-allowance of playback based on the youngest age among the calculated ages of the respective viewers.

In another preferred construction, the video playback method of a video player further comprising the steps of storing the date of birth of each viewer in the date of birth storage unit when a password for a manager is input through the operation means, as well as outputting a password for each viewer to the operation means, when a password for each viewer is input through the operation means, calculating an age of a viewer whose password is input, as well as controlling, when a parental lock is set on the viewer in question, the playback means to play back video on which the parental lock in question is not set, and when a plurality of passwords each for each viewer are input through the operation means, calculating an age of a viewer whose password is input, as well as determining allowance/non-allowance of playback based on the youngest age among the calculated ages of the respective viewers.

According to another aspect of the invention, a computer readable memory storing a video player controlling program for determining allowance/non-allowance of playback by a video player having playback means for playing back a video recording medium, the control means for controlling the playback means in response to external input, as well as externally outputting a video signal played back by the playback means, and operation means for inputting setting data input by a user to the control means, as well as externally displaying setting data output from the control means, wherein the video player controlling program calculates an age of each viewer based on a date of birth input through the operation means and current time and date, and determines allowance/non-allowance of playback by the playback means based on parental lock information stored in advance in the video recording medium and the calculated age.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, embodiments of the present invention will be described with reference to the drawings. The present embodiment enables a video player such as DVD player software for a personal computer to automatically determine on parental lock setting of DVD contents which a user tries to view. In the present embodiment, a manager registers names and dates of birth of users in advance and at the start of each user's viewing of DVD contents, obtains parental lock setting information (e.g. NC-17, R, PG-13, PG, G in the U.S.A.) of the DVD contents and compares user's parental lock information and age information to determine whether the user is allowed to view the DVD contents.

Figure 1:
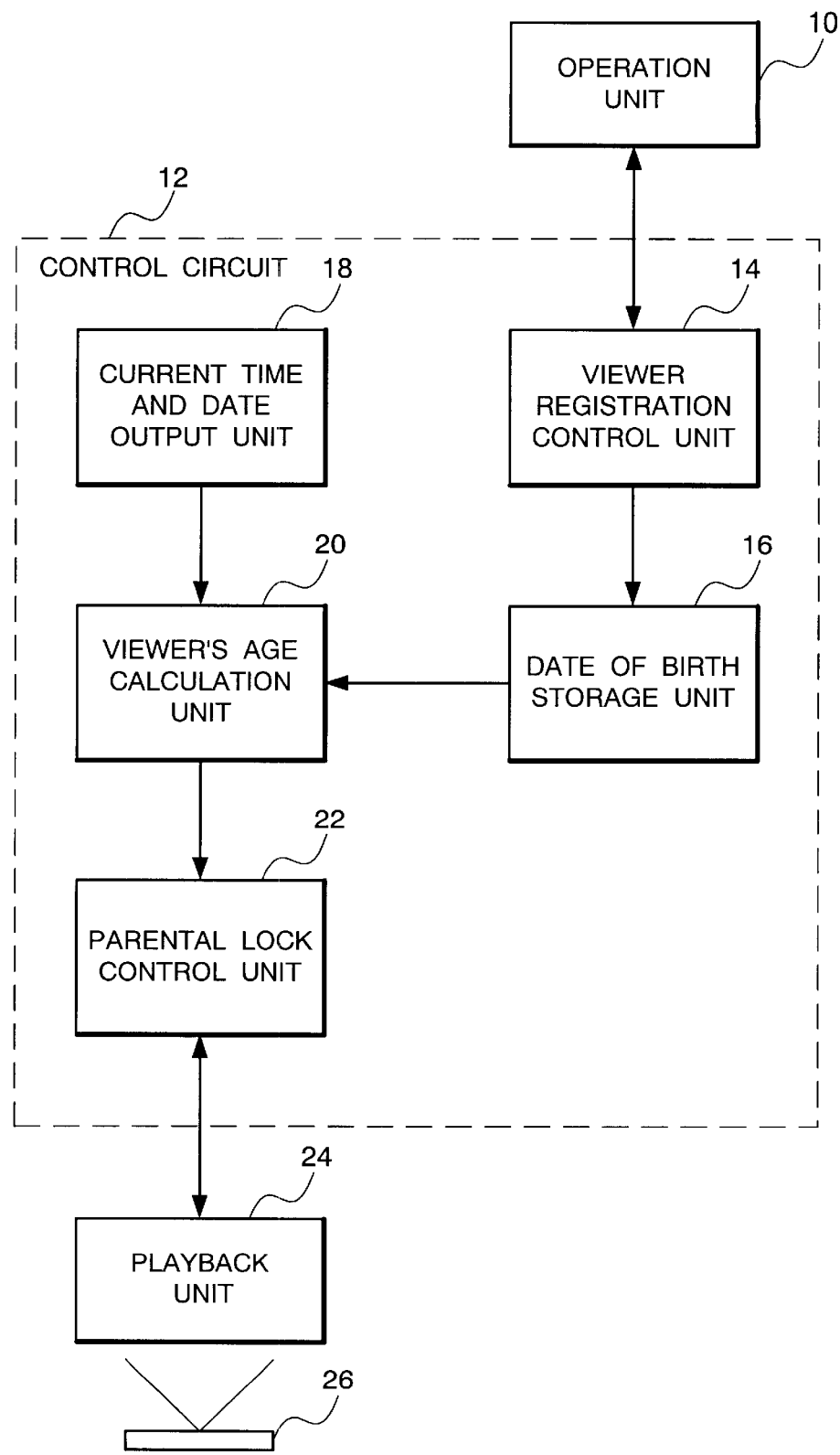
FIG. 1 is a block diagram showing a structure of a video player according to a first embodiment of the present invention.

FIG. 1 is a block diagram showing an example of a structure of the present embodiment. As illustrated in FIG. 1, the video player according to the present embodiment includes a playback unit 24 for playing back a video recording medium 26, a control circuit 12 for controlling the playback unit 24 according to external input, as well as externally outputting a video signal played back by the playback unit 24, and an operation unit 10 for applying setting data input by a user to the control circuit 12, as well as externally displaying the setting data output from the control circuit 12. The control circuit 12 includes a current time and date output unit 18 for outputting current time and date, a date of birth storage unit 16 for storing a date of birth of each viewer applied from the operation unit 10, a viewer's age calculation unit 20 for calculating an age of each viewer based on a date of birth stored in the date of birth storage unit 16 and current time and date output by the current time and date output unit 18, and a parental lock control unit 22 for determining whether playback by the playback unit 24 is allowed or not based on parental lock information stored in advance in the video recording medium 26 and an age calculated by the viewer's age calculation unit 20.

Among video recording media is, for example, the above-described DVD. In a case of a DVD, the playback unit includes an optical head for optically detecting a state of a recording plane of the DVD and a motor for rotating the DVD in response to a playback signal at the optical head. In a case where the video player is a simple substance DVD player, the operation unit 10 includes a display part provided on the front side of the player and a key part having a plurality of keys for the respective functions. When the device is a DVD player mounted on a personal computer, the operation unit 10 is an application to run dependently on an operating system of the personal computer, and is physically realized by a keyboard and a display.

In the present embodiment, a viewer's date of birth (date of birth) is input in advance by means of the operation unit 10 and the date of birth information is stored in the date of birth storage unit 16. Then, at actual viewing, first based on current time and date information obtained by the current time and date output unit 18, the current age of the viewer is calculated from the date of birth stored in the date of birth storage unit.

Subsequently, the parental lock control unit 22 reads parental lock information stored in the video recording medium 26 and determines whether viewing of the video in question is allowed or not based on the parental lock information and the age of the viewer. Thus, determination on a parental lock is automatically made according to the current time and date to eliminate the need of input of a viewer's age every time he completes his birthday, thereby making effective use of the parental lock function without complicated operation.

Also in the preferred embodiment, the control circuit 12 preferably includes a viewer registration control unit 14 for storing each viewer's date of birth in the date of birth storage unit, as well as outputting a password of each viewer to the operation means 10 upon application of a password for manager from the operation means 10. In this case, when numbers of viewers exist, one manager is responsible for registration or correction of their dates of birth, whereby the parental lock function can be excellently maintained.

Furthermore, for viewing video it is preferable to require input of a password of each viewer. In this case, the parental lock control unit 22, when a password of each viewer is applied from the operation unit 10, controls the viewer's age calculation unit 20 to calculate the age of the viewer whose password is applied. Then, when no parental lock is set on the age, playback by the playback unit 24 is started (playback allowance control function). On the other hand, when a parental lock is set on the viewer in question, playback by the playback unit 24 is inhibited (playback inhibition control function). When a parental lock is set on the viewer, it is also preferable to control the playback unit 24 to play back video (story) on which the parental lock is not set (viewing-allowed video playback control function).

Then, in a case where numerous passwords are applied and numbers of persons view video at the same time, at the input of a plurality of passwords of the respective viewers through the operation unit 10, the parental lock control unit 22 may control the viewer's age calculation unit 20 to calculate the age of each viewer whose password is applied and determine allowance/non-allowance of playback based on the youngest age among the ages of the respective viewers calculated by the viewer's age calculation unit 20.

Figure 2:
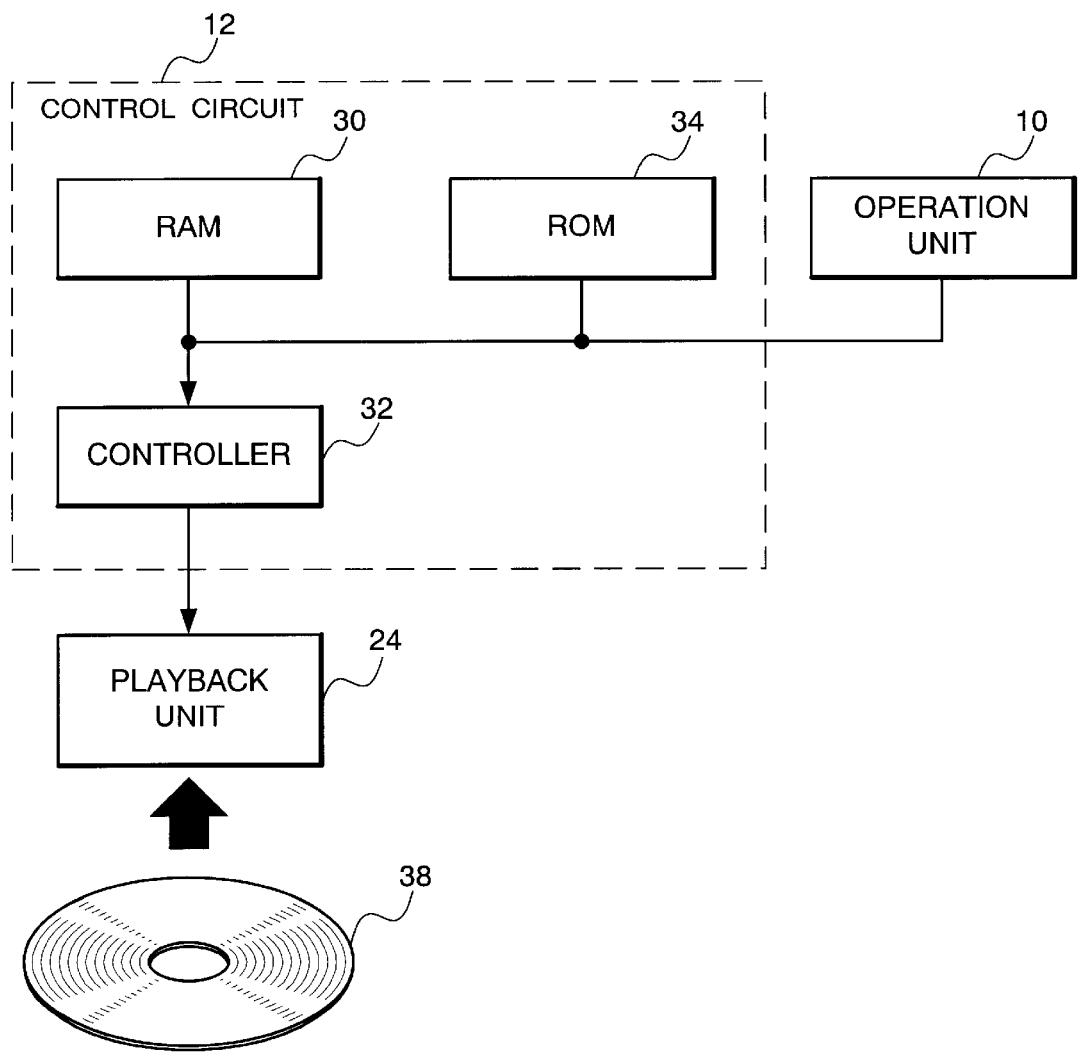
FIG. 2 is a block diagram showing a structure of hardware resources of the video player shown in FIG. 1.

FIG. 2 is a block diagram showing a structure of hardware resources of the video player illustrated in FIG. 1. As shown in FIG. 2, the control circuit 12 illustrated in FIG. 1 includes a controller 32 having an arithmetic unit such as a CPU, a ROM 34 storing a program and data to be read by the controller 32, and a RAM 30 as a main storage of the controller 32. The ROM 34 stores a program for controlling the video player.

Then, the controller 32 executing the video player control program will function as the parental lock control unit 22 shown in FIG. 1 etc. In the example shown in FIG. 2, playback of not a common video recording medium but a storage medium 38 which stores the video player control program by the playback unit 24 enables the contents of the ROM 34 to be updated.

As instructions to operate the controller 32, the video player control program includes a current time and date output instruction to output current time and date, a date of birth storage instruction to store a date of birth of each viewer input through the operation unit, a viewer's age calculation instruction to calculate the age of each viewer based on a date of birth stored in response to the date of birth storage instruction and current time and date output in response to the current time and date output instruction, and a parental lock control instruction to determine whether playback by the playback unit is allowed or not based on parental lock information stored in advance in the video recording medium and the age calculated in response to the viewer's age calculation instruction. These instructions are stored in the storage medium 38 such as a DVD and supplied to the video player.

Next, operation will be described. In the present embodiment, first, a manager A registers names and dates of birth of all the users. Every time a user is newly added, the manager registers a name and a date of birth of the user. The manager A inputs a name and a date of birth of each user through a user registration screen and the input data is stored in user data. At this time of user registration, a user's password is issued and the manager A notifies each user of his password.

A user B was born in 1982 and is 16 years old now (as of 1999). The user B first selects the name of the user B from a user list registered in the present DVD player and inputs a password issued from the manager at the time of user registration. The input password refers to password information of user data by the DVD application and when the input password and the user data password coincide with each other, activation of the application is continued and otherwise stopped. As a result, a person whose password is not registered in advance can be restricted in viewing.

The user B is not allowed to view the DVD contents whose viewing is not allowed to those who under the age of 17. When the user B tries to view the DVD contents C which those who under the age of 17 are not allowed to view, the viewer's age calculation unit of the present system obtains date of birth information B1 of the user B from among user data and today's date information D from calendar information that the main body of the personal computer has. The age determination unit of the present system calculates the age of the user B based on the information B1 and D and then obtains parental lock information C1 of the contents C. The viewing allowance/non-allowance determination part compares the information C1 and the age of the user B calculated by the age determination unit and determines that the user is younger than 17 years old to transfer the determination that viewing is not allowed to a message display unit of the present system. Since the determination is made that viewing is not allowed, the message display unit displays a message indicating that viewing is not allowed.

Here, assume that the user B completes his 17th birthday. When the user B attaining his birthday tries to view the contents C again, the age determination unit this time determines that the user B is 17 years old, compares his age with the parental lock information C1 and determines that viewing is allowed to instruct the DVD playback application side to start playback.

Embodiment

Figure 3:
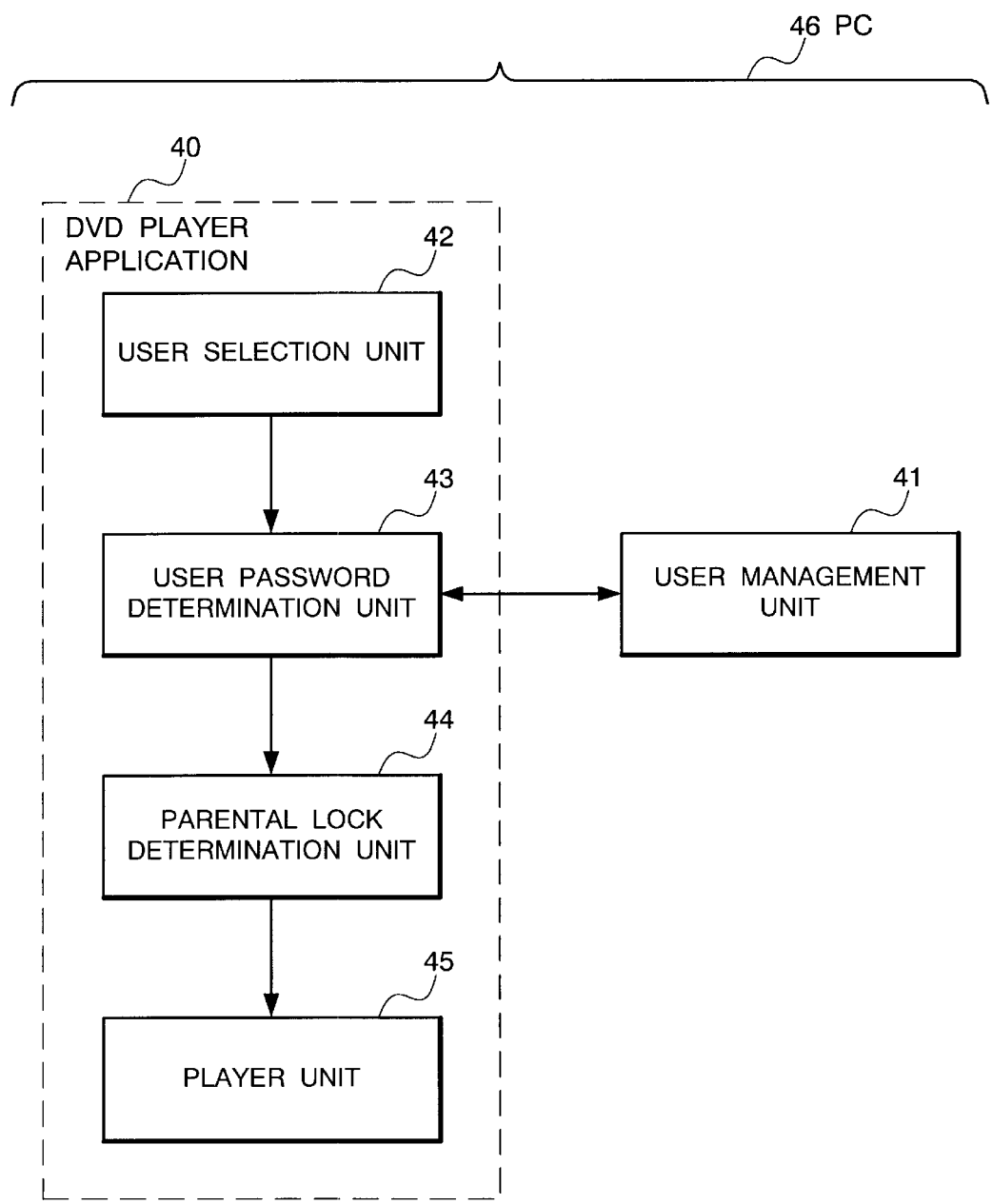
FIG. 3 is a block diagram showing an example of a specific structure of the video player of the present invention.

Next, a specific example of the video player of the present invention will be described. The video player here is a personal computer (PC) 46 having a DVD playback function as illustrated in FIG. 3. Then, the device includes a DVD player application 40 to run on the personal computer 46 and a user management unit 41 used by a manager. The DVD player application 40 includes a user selection unit 42 for selecting a user at the time of activation, a user password determination unit 43 for determining a user's password at the time of activation, a parental lock determination unit 44 for determining user's parental lock, and a player unit 45 for actually playing back the DVD contents.

The personal computer 46 is a personal computer having the present system installed therein which requires a built-in DVD drive. The user selection unit 42 is a part for, when a user activates the application, displaying a list of all the users who have been already registered and whose passwords have been issued by the manager, from which list a user himself selects his own name.

The user password determination unit 43 is a part for making a user who selects his own name at the user selection unit 42 to input his password issued by the manager and comparing for coincidence between the password input by the user and a password set by the manager at the time of user registration, and when the passwords coincide with each other, activation of the DVD application is continued. When they fail to coincide with each other, the unit 43 urges the user to input his password a predetermined number of times and when the correct password is not input by the predetermined number of times, activation is stopped.

The parental lock determination unit 44 is a part for calculating a current age of a user based on user's date of birth data registered by the manager at the time of user registration and calendar information (current date) that the operating system of the personal computer has and comparing the obtained age and paternal lock setting of the DVD contents which the user intends to view. When comparison between a user's age and paternal lock on the contents finds that the user's age is older than the upper bounds of age not allowed to view the contents, the unit 44 determines that viewing is allowed to transfer the processing to the player unit.

The player unit 45 is a part for conducting playback of the DVD contents when the determination is made that viewing is allowed by the parental lock determination unit 44. When the DVD contents which the user intends to view have no paternal lock setting, the paternal lock determination unit 44 determines that viewing is allowed, whereby playback of the DVD contents is conducted by the player unit 45.

The user management unit 41 is a system for a manager of the present system (in a case of home use, father or mother is ordinarily appropriate for this role) to register names and dates of birth of all the users (every member of the family in a case of home use), as well as setting a password of each of the users. In the present system, one manager is set because there is a possibility that a user will intentionally change his own date of birth to view the DVD contents he is not allowed to view if each user is allowed to register his own information at his will.

Figure 4:
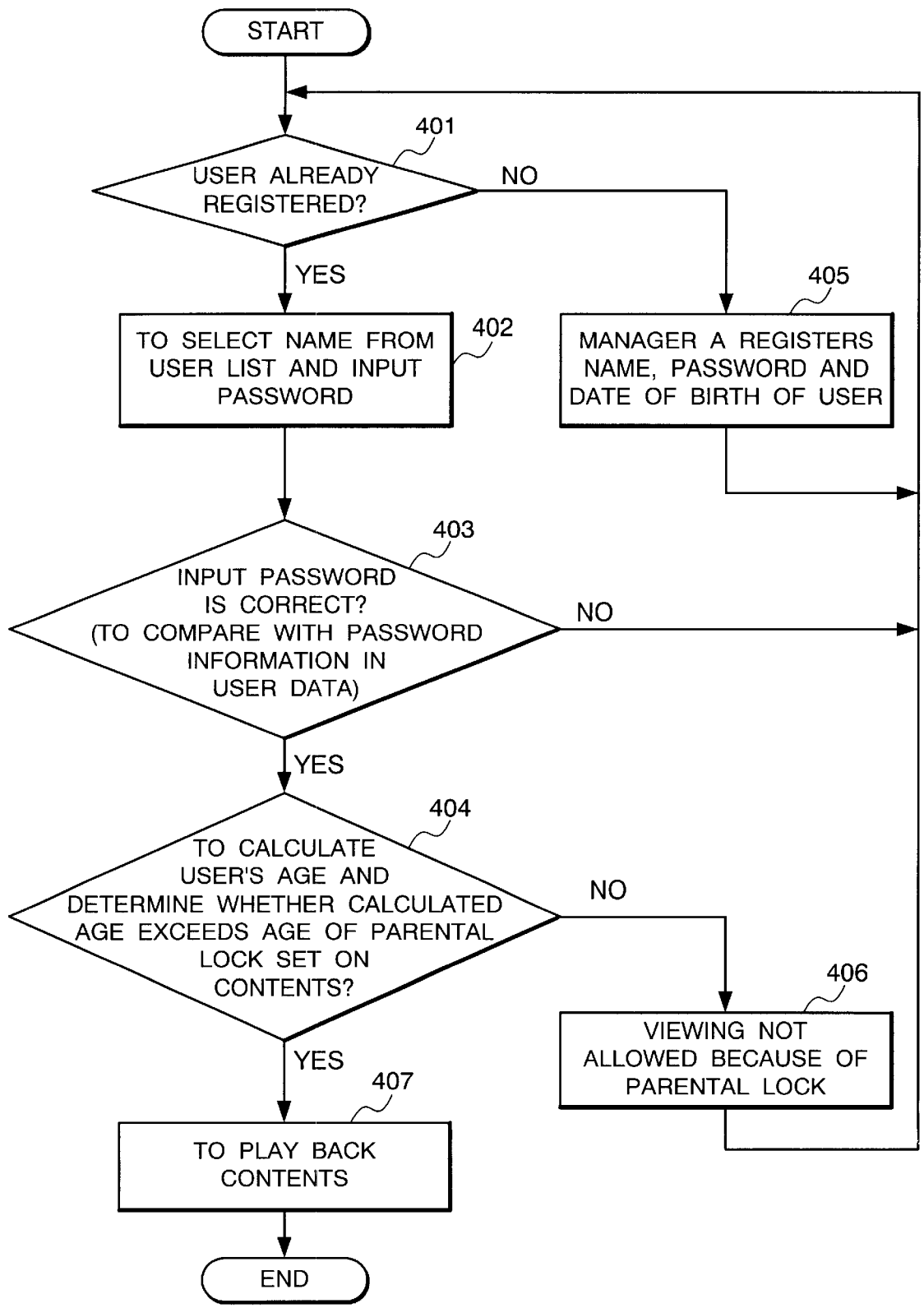
FIG. 4 is a flow chart showing an example of operation of the present embodiment illustrated in FIG. 3.

Next, operation of the present embodiment will be described based on the flow chart of FIG. 4. First, the manager A of the present system registers all the users of the DVD player application. The manager registers a name and a date of birth of each user to issue a password. The password is notified by the manager to each user. When a new user is added after the registration, the manager registers a name and a date of birth of the user whenever occasion to issue a password.

When the DVD player application is executed, a list of users is displayed, from which the user selects his own name. At this time, when the user is yet to be registered (Step 401), the use is not allowed. The manager A accordingly registers the above information (Step 405). The registered user selects his own name and subsequently inputs his own password. The input password is collated with password information in the user data and when they coincide with each other, the DVD player application is activated (Steps 402 and 403).

Upon activation of the DVD player application 40, the user inserts the DVD contents with parental lock into a DVD drive. The DVD player application play backs the DVD contents when the user's age exceeds the parental lock setting value of the DVD contents (Step 404) and refrains from playback when the same does not exceed the value (Step 406).

Next, another embodiment of the present invention will be described. In the present embodiment, upon activation of the application by the user, the user selection unit 42 of the DVD player application 40 displays a list of all the users who are already registered and whose passwords are issued by the manager, from which list a user selects his own name, and in this example four users U1~U4 who intend to view the DVD contents together select all their names of all the users are selected.

The password determination unit 43 is a part for making the users U1~U4 who selected their names at the user selection unit 42 to input their passwords issued by the manager and comparing the passwords input by the users and passwords set by the manager at the time of user registration, and when all the users' passwords coincide with the set passwords, activation of the DVD player application 40 will be continued.

The parental lock determination unit 44 first determines, based on the date of birth data of the respective users (U1~U4) registered by the manager at the time of user registration, a user UY of the youngest age among the users U1~U4. Next, the unit calculates the current age of the user UY from the calendar information (current date) that the operating system of the personal computer 1 has and compares the age and the parental lock setting of the DVD contents which the user intends to view. When the age of the user UY exceeds the age not allowed to view the DVD contents, the unit 44 determines that the viewing is allowed to transfer the processing to the player unit.

The player unit 45 of the DVD player application 40 is a part for conducting playback of the DVD contents when the parental lock determination unit 44 makes a determination of allowance of viewing. Also when the DVD contents which the users U1~U4 intend to view have no parental lock setting, the parental lock determination unit 44 makes a determination of allowance of viewing, whereby playback of the DVD contents is conducted by the present player unit 45.

The user management unit 41 is a system for the manager A of the present system (in a case of home use, father or mother is ordinarily appropriate for this role) to register names and dates of birth of all the users U1~U4 (in a case of home use, every member of the family), as well as setting passwords of the respective users. In the present system, one manager should be set because there is a possibility that a user will intentionally change his own date of birth to view the DVD contents he is not allowed to view if each user is allowed to register his own information at his will.

Figure 5:
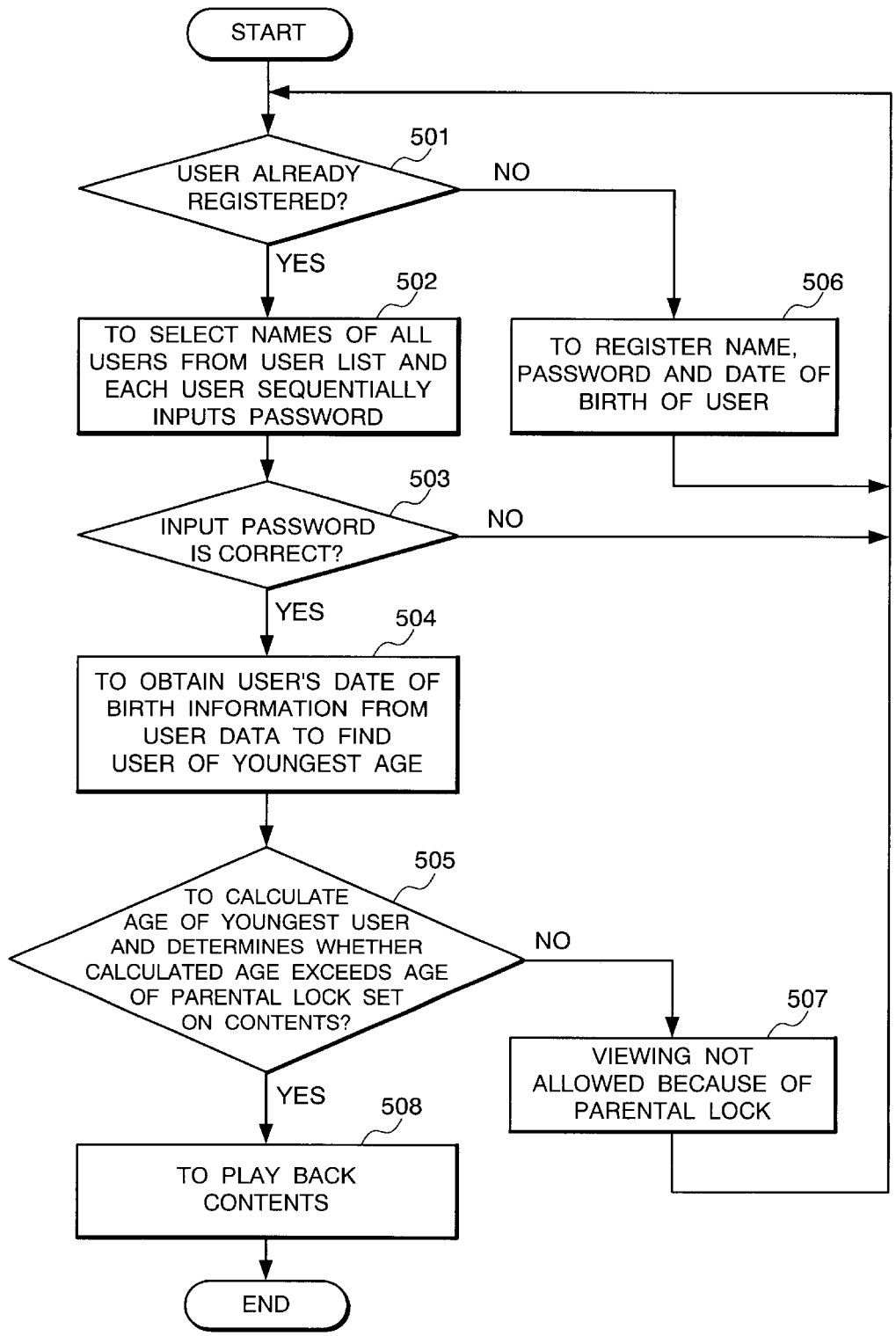
FIG. 5 is a flow chart showing an example of operation of another embodiment of the present invention.

Next, operation of the present embodiment will be described based on the flow chart of FIG. 5. First, the manager A of the present system registers all the users (U1~U4) of the DVD player application. The manager A registers a name and a date of birth of each user to issue a password. The password is notified by the manager to each user (Step 501).

Here, the four users U1~U4 activate the DVD player application to view the DVD contents C together. Then, a list of all the users registered by the manager A is displayed, from which the users U1~U4 select their own names. At that time, when the user is not already registered (Step 501), the use is not allowed. The manager A then registers the above information (Step 506). The registered users input their own passwords one by one. The input passwords are collated with password information in the user data and when all the passwords coincide with the password information, activation of the DVD player application is continued (Steps 502 and 503).

Subsequently, the DVD player application obtains date of birth information of the users U1~U4 from the user data to determine the user UY of the youngest age (Step 504). Upon activation of the DVD player application and insertion of the DVD contents with parental lock into the DVD drive by the users, the DVD player application play backs the DVD contents (Step 508) when the age of the user UY is older than the age UP of the parental lock setting value on the DVD contents (Step 505) and refrains from playback when the same is younger (Step 507).

As described in the foregoing, the present embodiment has the effect of reducing a burden of resetting a parental lock for each user in a case where on one personal computer, numbers of users of different ages view the DVD contents. Conventional DVD players for a personal computer is incapable of specifying users and accordingly requires change of a parental lock for each user. This effect is a great advantage in a case where one family shares a personal computer having the DVD player function and parents manage a parental lock of the DVD contents for their children.

In addition, since even when each user completes his birthday to change his age, resetting of a parental lock is unnecessary, a burden on the change of setting is reduced. Conventional DVD players for personal computer has a parental lock fixed and accordingly needs to change a parental lock individually when an age of each user changes. The present embodiment is effective when a manager manages a plurality of users.

Thus structured and functioning present invention provides as excellent a video player as ever which enables an appropriate parental lock to be set according to current time and date without laborious work of updating age information every time a viewer attains his birthday and in a case where a manager is provided to set a password for each user, enables a parental lock to function effectively without laborious input operation even when numbers of people view video because the viewer age calculation unit calculates an age of a viewer by subtracting a date of birthday stored in the date of birth storage unit from current time and date and subsequently the parental lock control unit determines allowance/non-allowance of playback by the playback unit based on parental lock information read by the playback unit and the calculated viewer's age.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A video player comprising:

playback means for playing back a video recording medium;

control means for controlling the playback means in response to external input, as well as externally outputting a video signal played back by the playback means; and operation means for inputting setting data input by a user to said control means, as well as externally displaying setting data output from the control means, wherein said control means comprises:

a current time and date output unit for outputting current time and date;

a date of birth storage unit for storing a date of birth of each viewer input through said operation means;

a viewer's age calculation unit for calculating an age of each viewer based on a date of birth stored in said date of birth storage unit and current time and date output by said current time and date output unit; and a parental lock control unit for determining allowance/non-allowance of playback by said playback means based on parental lock information stored in advance in said video recording medium and an age calculated by said viewer's age calculation unit.

2. The video player according to claim 1, wherein said control means comprises:

a viewer registration control unit for storing said date of birth of each viewer in said date of birth storage unit when a password is input through said operation means, as well as outputting a password for each viewer to said operation means.

3. The video player according to claim 1, wherein said control means comprises:

a viewer registration control unit for storing said date of birth of each viewer in said date of birth storage unit when a password is input through said operation means, as well as outputting a password for each viewer to said operation means, and said parental lock control unit having a playback allowance control function of controlling, when a password for each viewer is input through said operation means, said viewer's age calculation unit to calculate an age of a viewer whose password is input, as well as controlling said playback means to start playback when no parental lock is set on the viewer in question.

4. The video player according to claim 1, wherein said control means comprises:

a viewer registration control unit for storing said date of birth of each viewer in said date of birth storage unit when a password is input through said operation means, as well as outputting a password for each viewer to said operation means, and said parental lock control unit having a playback inhibition control function of controlling, when a password for each viewer is input through said operation means, said viewer's age calculation unit to calculate an age of a viewer whose password is input, as well as inhibiting playback by said playback means when a parental lock is set on the viewer in question.

5. The video player according to claim 1, wherein said control means comprises:

a viewer registration control unit for storing said date of birth of each viewer in said date of birth storage unit when a password is input through said operation means, as well as outputting a password for each viewer to said operation means, and said parental lock control unit having a viewing-allowed video playback control function of controlling, when a password for each viewer is input through said operation means, said viewer's age calculation unit to calculate an age of a viewer whose password is input, as well as controlling, when a parental lock is set on the viewer in question, said playback means to play back video on which the parental lock in question is not set.

6. The video player according to claim 1, wherein said control means comprises:

a viewer registration control unit for storing said date of birth of each viewer in said date of birth storage unit when a password for is input through said operation means, as well as outputting a password for each viewer to said operation means, and said parental lock control unit having a playback allowance control function of controlling, when a password for each viewer is input through said operation means, said viewer's age calculation unit to calculate an age of a viewer whose password is input, as well as controlling said playback means to start playback when no parental lock is set on the viewer in question, and a function of controlling, when a plurality of passwords each for each viewer are input through said operation means, said viewer's age calculation unit to calculate an age of a viewer whose password is input, as well as determining allowance/non-allowance of playback based on the youngest age among the ages of the respective viewers calculated by the viewer's age calculation unit.

7. The video player according to claim 1, wherein said control means comprises:

a viewer registration control unit for storing said date of birth of each viewer in said date of birth storage unit when a password for a manager is input through said operation means, as well as outputting a password for each viewer to said operation means, and said parental lock control unit having a playback inhibition control function of controlling, when a password for each viewer is input through said operation means, said viewer's age calculation unit to calculate an age of a viewer whose password is input, as well as inhibiting playback by said playback means when a parental lock is set on the viewer in question, and a function of controlling, when a plurality of passwords, each for each viewer are input through said operation means, said viewer's age calculation unit to calculate an age of a viewer whose password is input, as well as determining allowance/non-allowance of playback based on the youngest age among the ages of the respective viewers calculated by the viewer's age calculation unit.

8. The video player according to claim 1, wherein said control means comprises:

a viewer registration control unit for storing said date of birth of each viewer in said date of birth storage unit when a password is input through said operation means, as well as outputting a password for each viewer to said operation means, and said parental lock control unit having a viewing-allowed video playback control function of controlling, when a password for each viewer is input through said operation means, said viewer's age calculation unit to calculate an age of a viewer whose password is input, as well as controlling, when a parental lock is set on the viewer in question, said playback means to play back video on which the parental lock in question is not set, and a function of controlling, when a plurality of passwords each for each viewer are input through said operation means, said viewer's age calculation unit to calculate an age of a viewer whose password is input, as well as determining allowance/non-allowance of playback based on the youngest age among the ages of the respective viewers calculated by the viewer's age calculation unit.

9. A video playback method of a video player having playback means for playing back a video recording medium, control means for controlling the playback means in response to external input, as well as externally outputting a video signal played back by the playback means, and operation means for inputting setting data input by a user to said control means, as well as externally displaying setting data output from the control means, comprising:

calculating an age of each viewer based on a date of birth stored in a date of birth storage unit and current time and date output by a current time and date output unit, and determining allowance/non-allowance of playback by said playback means based on parental lock information stored in advance in said video recording medium and an age calculated by a viewer's age calculation unit.

10. The video playback method of a video player according to claim 9, further comprising:

storing said date of birth of each viewer in said date of birth storage unit when a password for a manager is input through said operation means, as well as outputting a password for each viewer to said operation means.

11. The video playback method of a video player according to claim 9, further comprising:

storing said date of birth of each viewer in said date of birth storage unit when a password for a manager is input through said operation means, as well as outputting a password for each viewer to said operation means, and when a password for each viewer is input through said operation means, calculating an age of a viewer whose password is input, as well as to starting playback by said playback means when no parental lock is set on the viewer in question.

12. The video playback method of a video player according to claim 9, further comprising:

storing said date of birth of each viewer in said date of birth storage unit when a password for a manager is input through said operation means, as well as outputting a password for each viewer to said operation means, and when a password for each viewer is input through said operation means, calculating an age of a viewer whose password is input, as well as inhibiting playback by said playback means when a parental lock is set on the viewer in question.

13. The video playback method of a video player according to claim 9, further comprising:

storing said date of birth of each viewer in said date of birth storage unit when a password for a manager is input through said operation means, as well as outputting a password for each viewer to said operation means, and when a password for each viewer is input through said operation means, calculating an age of a viewer whose password is input, as well as controlling, when a parental lock is set on the viewer in question, said playback means to play back video on which the parental lock in question is not set.

14. The video playback method of a video player according to claim 9, further comprising:

storing said date of birth of each viewer in said date of birth storage unit when a password is input through said operation means, as well as outputting a password for each viewer to said operation means, when a password for each viewer is input through said operation means, calculating an age of a viewer whose password is input, as well as starting playback by said playback means when no parental lock is set on the viewer in question, and when a plurality of passwords each for each viewer are input through said operation means, calculating an age of a viewer whose password is input, as well as determining allowance/non-allowance of playback based on the youngest age among the calculated ages of the respective viewers.

15. The video playback method of a video player according to claim 9, further comprising:

storing said date of birth of each viewer in said is input through said operation means, as well as outputting a password for each viewer to said operation means, when a password for each viewer is input through said operation means, calculating an age of a viewer whose password is input, as well as inhibiting playback by said playback means when a parental lock is set on the viewer in question, and when a plurality of passwords each for each viewer are input through said operation means, calculating an age of a viewer whose password is input, as well as determining allowance/non-allowance of playback based on the youngest age among the calculated ages of the respective viewers.

16. The video playback method of a video player according to claim 9, further comprising:

storing said date of birth of each viewer in said date of birth storage unit when a password is input through said operation means, as well as outputting a password for each viewer to said operation means, when a password for each viewer is input through said operation means, calculating an age of a viewer whose password is input, as well as controlling, when a parental lock is set on the viewer in question, said playback means to play back video on which the parental lock in question is not set, and when a plurality of passwords each for each viewer are input through said operation means, calculating an age of a viewer whose password is input, as well as determining allowance/non-allowance of playback based on the youngest age among the calculated ages of the respective viewers.

17. A computer readable memory storing a video player controlling program for determining allowance/non allowance of playback by a video player having playback means for playing back a video recording medium, the control means for controlling the playback means in response to external input, as well as externally outputting a video signal played back by the playback means, and operation means for inputting setting data input by a user to said control means, as well as externally displaying setting data output from the control means, wherein said video player controlling program:

calculates an age of each viewer based on a date of birth input through said operation means and current time and date, and determines allowance/non-allowance of playback by said playback means based on parental lock information stored in advance in said video recording medium and said calculated age.

18. The computer readable memory storing a video player control program according to claim 17, wherein:

said video player control program stores said date of birth of each viewer in said date of birth storage unit when a password for a manager is input through said operation means, as well as outputting a password for each viewer to said operation means.

19. The computer readable memory storing a video player control program according to claim 17, wherein:

said video player control program stores said date of birth of each viewer in said date of birth storage unit when a password for a manager is input through said operation means, as well as outputs a password for each viewer to said operation means, and when a password for each viewer is input through said operation means, calculates an age of a viewer whose password is input, as well as starting playback by said playback means when no parental lock is set on the viewer in question.

* * * * *